Sept. 24, 1968      H. N. GRILLOT      3,402,956
SPRING KEEPER BLADE
Filed Oct. 3, 1966      2 Sheets-Sheet 1
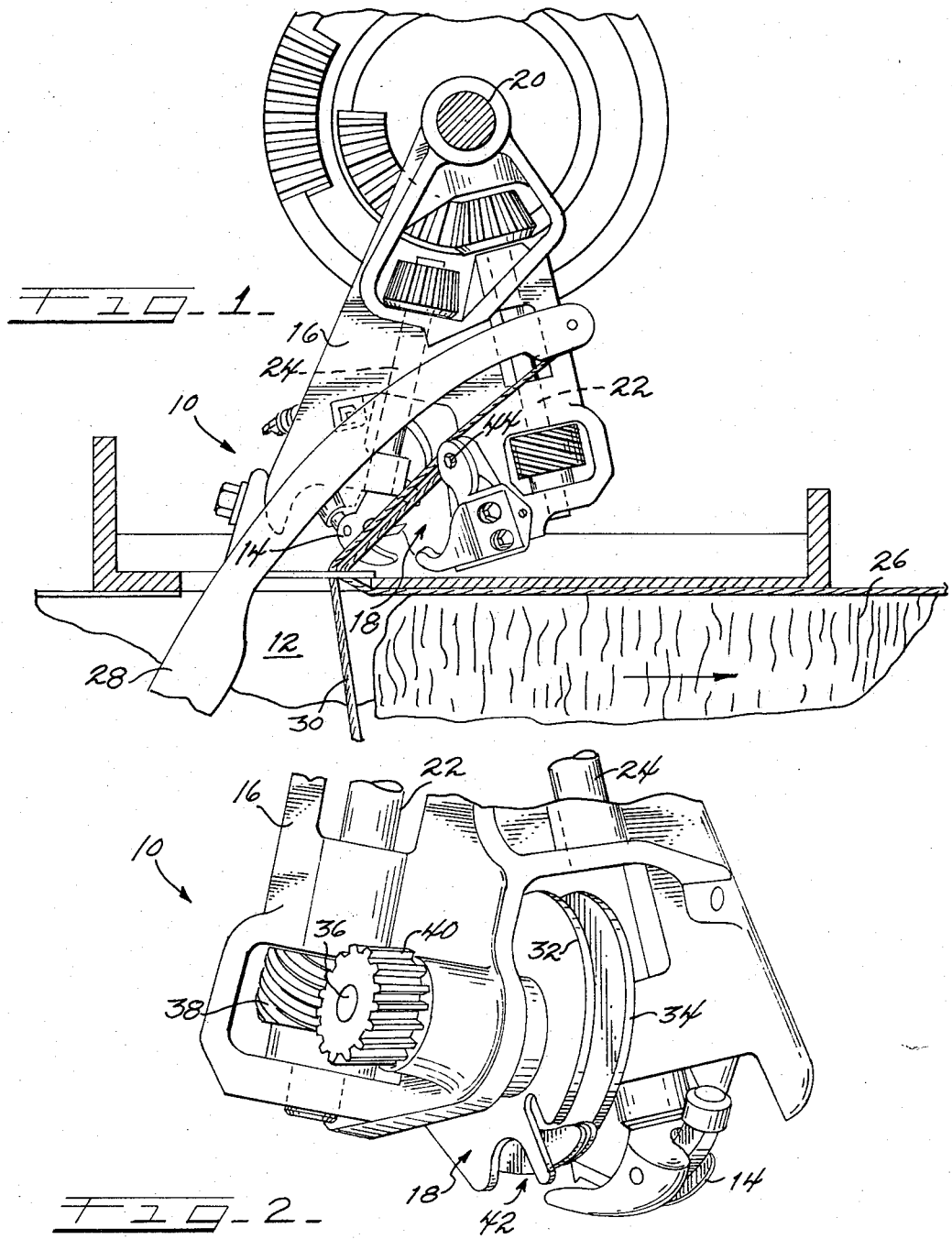
INVENTOR
HOMER N. GRILLOT
BY *Richard E. Backus*
ATT'Y.

Sept. 24, 1968   H. N. GRILLOT   3,402,956
SPRING KEEPER BLADE
Filed Oct. 3, 1966   2 Sheets-Sheet 2
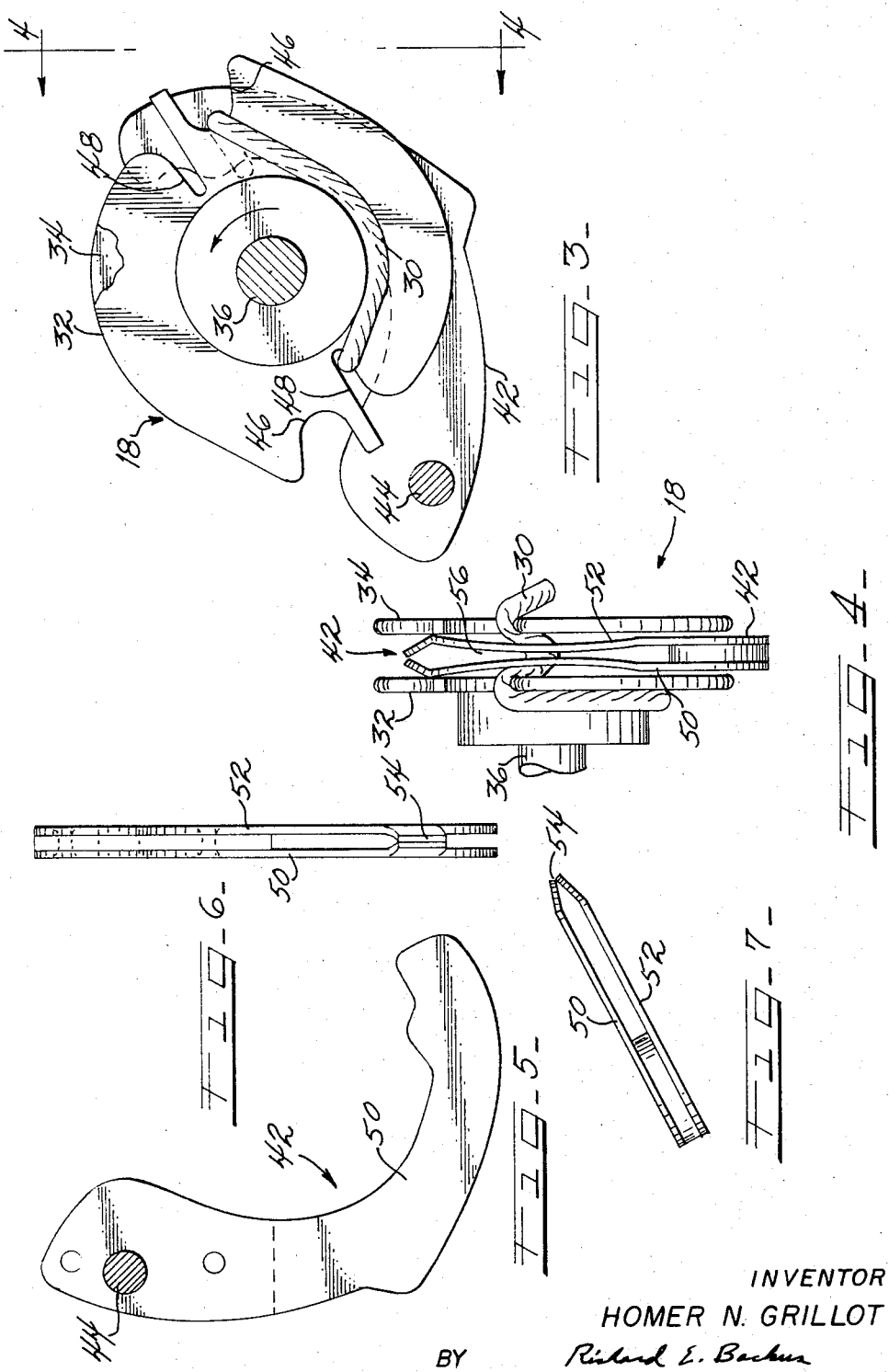
INVENTOR
HOMER N. GRILLOT
BY Richard E. Backus
ATT'Y.

United States Patent Office 3,402,956
Patented Sept. 24, 1968

3,402,956
SPRING KEEPER BLADE
Homer N. Grillot, Naperville, Ill., assignor to International Harvester Company, Chicago, Ill., a corporation of Delaware
Filed Oct. 3, 1966, Ser. No. 583,813
2 Claims. (Cl. 289—14)

ABSTRACT OF THE DISCLOSURE

A cord holder for use with a baler knotter mechanism, and comprising a pair of axially spaced, slotted cord holder discs, and a keeper blade cooperatively arranged therewith for holding cord carried by said discs. The keeper blade includes a pair of resilient plate members interposed between said discs and adapted to forcibly hold the cord against said discs.

---

This invention relates generally to automatic hay baling machines and more specifically relates to an improved keeper blade for use with the cord holder assembly in the knotter mechanism of an automatic hay baling machine.

It is a general object of the present invention to provide an improved cord holder assembly for a knotter mechanism which more securely grips the twine or cord during the baling operation to minimize the chance of loose bales. In existing hay baling machines variations in operating conditions may result in the cord or twine pulling loose from the cord holder during the bale-forming and knot-tying cycles with the result that the knot is not tied properly. These varying operating conditions include different cord diameters, variations in the coefficient of fraction of the cord material, wear in the cord holder parts resulting from abrasive action of the cord, and variation in the tension on the cord during baling due to changing resiliency of the baled material. Moreover, the relatively inflexible characteristics of existing holder parts results in frequent failures due to the holder damaging the cord material.

Accordingly, it is an object of the present invention to provide a cord holder assembly incorporating an improved keeper blade which securely grips the twine or cord in the cord holder by automatically compensating for varying operating conditions.

It is a further object of the present invention to provide a cord holder assembly incorporating a novel keeper blade formed from a resilient material affording sufficient strength to securely grip the cord or twine in the cord holder assembly while automatically compensating for varying operating conditions such as cord size and wear in the holder parts.

It is another important object of the present invention to provide a cord holder assembly incorporating an improved spring keeper blade comprising a pair of resilient plate members spaced apart to deflect while gripping the cord with an increased holding ability and with less tendency to cut or damage the cord material.

Other objects and advantages of the present invention will become apparent to those skilled in the art when the following specification is read in conjunction with the accompanying drawings, wherein:

FIGURE 1 is a side elevation view, partially cut away, illustrating one knotter assembly of an automatic baling machine incorporating features of the present invention;

FIGURE 2 is a rear perspective view of elements of the knotter assembly of FIGURE 1 illustrating the relative position of the cord holder assembly in the knotter assembly;

FIGURE 3 is a side elevational view of the cord holder assembly and novel spring keeper blade of the present invention;

FIGURE 4 is an end view taken along the line 4—4 of FIGURE 3;

FIGURE 5 is a side view of the novel spring keeper blade;

FIGURE 6 is an end view of the spring keeper blade of FIGURE 5; and

FIGURE 7 is a bottom view of the spring keeper blade of FIGURE 5.

Referring now to the drawings and particularly FIGURE 1 the numeral 10 designates generally a twine or cord knotter assembly mounted above the bale forming chamber 12 of an automatic hay baling machine. A second knotter assembly (not shown) is provided to tie a second strand of twine or cord around the bale. The knotter assembly 10 comprises a billhook assembly 14 and a cord holder assembly 18 both of which are rotatably mounted on support 16. The knotter drive is conventional and comprises a knotter drive shaft 20 driving both cord holder shaft 22 and billhook drive shaft 24 which in turn drive the cord holder assembly and billhook assembly during a knotting cycle.

FIGURE 1 illustrates the knotter assembly just prior to a knotting operation in which bale 26 has been formed in chamber 12 and needle 28 has completed its inward stroke and delivered the tail end of cord strand 30 to the knotter assembly.

In FIGURE 2 the knotter assembly 10 is illustrated from the opposite side of that shown in FIGURE 1. The cord holder assembly 18 is mounted adjacent billhook assembly 14 in the conventional manner. The assembly 18 comprises a pair of parallel, spaced-apart discs 32 and 34 rotatably mounted on support 16 by means of spindle 36. Worm gear 38 on shaft 22 is in driving engagement with gear 40 secured to spindle 36 and serves to drive the cord holder assembly 18 during the knotting cycle.

The cord holder assembly 18 functions to hold the free end of the cord during the baling and knotting cycles and the tail end during the knotting cycle. To insure that the cord is securely gripped during these cycles a novel spring keeper blade 42 is provided between the discs 32 and 34 of the holder assembly. As illustrated in FIGURE 1 the keeper blade is pivotally mounted to support 16 by means of pivot pin 44.

Referring now to FIGURE 3 the cord holder assembly 18 is shown in greater detail. Each disc 32 and 34 is provided with two pair of symmetrical slots 46 and 48 for receiving the cord or twine. Each slot in a disc is in registry with a corresponding slot of the opposing disc. An adjacent two of the wide, shallow slots 46 receive the cord from the needle on its inward stroke and serve to position the tail end of the cord during the knotting cycle. Similarly, an adjacent two of the narrow, deep slots 48 receive the cord from the needle on its outward stroke and serve to position the free end of the cord during both the bale forming and knotting cycles.

During the knotting cycle cord holder assembly 18 is rotated counterclockwise as viewed in FIGURE 3 to align the slots for receiving the cord from the needle at the correct time. This moves the cord 30 against keeper blade 42 which is positioned between the holder discs. The cord is thereby jammed between the discs where it is securely held during the knotting and bale forming cycles.

The holding ability of assembly 18 is materially improved through utilization of the novel keeper blade 42 which comprises a pair of parallel, spaced-apart plates 50 and 52 having sufficient resiliency to deform as the cord is forced between the holder discs. This is achieved by fabricating the plates from a material having a relatively low spring rate as compared to the holder parts of conventional knotters. FIGURE 5 illustrates the keeper blade 42 mounted on pivot pin 44. FIGURES 6 and 7 illustrate the assembly of the resilient plates by securing them together at their distal ends at 54 by suitable means such as welding.

The illustration of FIGURE 4 shows the plates of keeper blade 18 deflected into the space 56 between the plates as the cord 30 is wedged between holder discs 32 and 34. This permits the keeper blade to automatically compensate for any variations in the diameter of cord used in the machine. The plates 50 and 52 also function to resiliently urge the cord against the inside of the holder discs with sufficient holding force irrespective of the gap between the blade and discs. This tends to compensate for wear in the holder parts without any reduction in the holding force of the keeper blade. Furthermore, since the keeper blade will deflect as the cord is forced into the holder assembly the chance of the blade cutting the cord is minimized.

It will be understood that various changes in the details and arrangement of parts which have been described and illustrated in order to explain the nature of the invention may be made by those skilled in the art within the principle and scope of the invention as expressed in the appended claims.

What is claimed is:

1. A cord holder for use with the knotter mechanism of a bale tying machine, said cord holder comprising: a support; a pair of axially spaced discs mounted on said support, each of said discs having cord receiving slots formed in the periphery thereof; a keeper blade including an anchor portion pinned to said support, and a pair of spaced plates extending outwardly from said anchor portion, said plates being interposed between said discs and having their distal ends interconnected, said plates being yieldable toward each other between said anchor portion and said interconnected ends; and means for rotating said discs as a unit from a cord receiving position wherein a cord is received in said peripheral slots to a cord holding position wherein said received cord is retained by said interposed plates, said plates being yieldable relative to one another in conformance with the thickness of said cord, the yieldability of said plates decreasing as the discs approach said holding position.

2. The invention as recited in claim 1 wherein each of said interposed plates includes a projection extending generally radially inwardly of said discs, said projections being disposed in the path of cord carried in said slot and adapted to holdingly engage said carried cord with said discs occupying said holding position, said relative yieldability of said plates being minimum with said discs in said holding position whereby deflection of said plates is minimum with said carried cord in engagement with said projections.

References Cited
FOREIGN PATENTS 497,474   12/1938   Great Britain.

LOUIS K. RIMRODT, *Primary Examiner.*